United States Patent [19]

Urquhart

[11] 4,362,622
[45] Dec. 7, 1982

[54] FILTER

[75] Inventor: Burton W. Urquhart, Nashua, N.H.

[73] Assignee: Ingersoll-Rand Company, Woodcliff, N.J.

[21] Appl. No.: 248,700

[22] Filed: Mar. 30, 1981

[51] Int. Cl.³ .............................................. B01D 33/26
[52] U.S. Cl. .................................................... 210/486
[58] Field of Search ................ 210/486, 499, 231, 331

[56] References Cited
U.S. PATENT DOCUMENTS 2,902,165  9/1959  Imershein ............................ 210/486
3,291,312  12/1966  Peterson ........................... 210/486 X
3,610,419  10/1971  Vallee et al. ........................ 210/486
4,332,862  6/1982  Desmet .

Primary Examiner—Thomas G. Wyse
Attorney, Agent, or Firm—F. S. Troidl

[57] ABSTRACT

A filter comprises a metal filter screen support with a metal screen on the support. A plurality of metal members are welded to the support and the screen.

4 Claims, 4 Drawing Figures

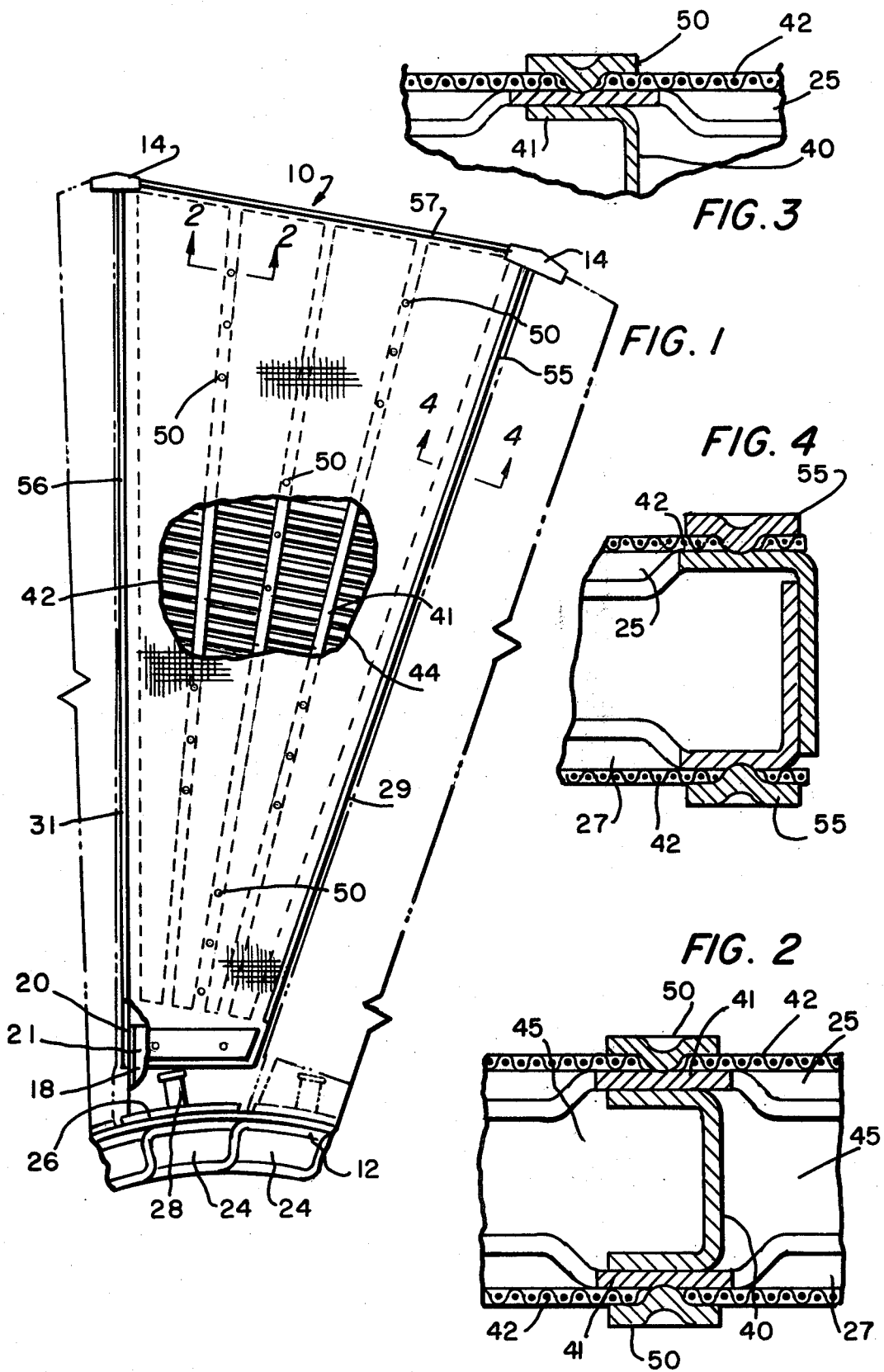

FILTER

This invention relates to a filtering apparatus, and, more particularly, to filters of the type used for filtering a slurry such as pulp stock for the manufacture of paper.

Currently, metal cloths or metal filter screens are attached to the filter support by various means such as by bolts, rivets, crimps or clamps. These are generally quite expensive. A relatively cheap way of connecting the metal filter screen to a support is by welding the screen directly to the support. However, when the screen is welded directly to the support, the screen is thinned, is weakened, and sometimes some of the filaments of the screen are cut off, causing holes through the screen. When this happens, solids pass through the screen, which, of course, is undesirable.

This invention provides a filter which can be quickly made, and the possibility of cutting the filaments or weakening them by thinning is minimized. The wire screen, even if the filament is very fine, can be quickly fastened to the screen support without damage, and the metal screen can be removed without damaging the support.

Briefly described, the invention is a filter which comprises a filter screen metal support to which a metal filter screen is welded. The welding is accomplished by including on the filter segment a plurality of metal members, such as metal disks, with each member welded to the screen and the support. The filter support has openings adjacent the filter screen and at least on drainage duct, thus permitting the filtrate through the screen, through the screen support openings, and through the drainage duct.

In addition to the metal disks welded on each face of the filter segment, metal strips may be welded to the support and the screen on each face of the filter segment along the radially-extending borders and the outer border of the filter segment.

The invention, as well as its many advantages, will be further understood by reference to the following detailed description and drawings in which:

FIG. 1 is an elevational side view of a filter segment constructed in accordance with one embodiment of the invention, shown with a portion of the screen broken away;

FIG. 2 is a view taken along lines 2—2 of FIG. 1 and in the direction of the arrows;

FIG. 3 is an enlarged view of a portion of FIG. 2; and

FIG. 4 is a view taken along lines 4—4 of FIG. 1 and in the direction of the arrows.

In the various figures, like parts are referred to by like numbers.

Referring to the figures and, more particularly, to FIG. 1, a filter segment for a disk-type filter is shown to illustrate the invention. The filter segment 10 is mounted on the usual rotatable hub 12 in juxtaposed relationship with other filter segments, adjacent ones being indicated by fragmentary and broken lines. The segment 10 is connected at its outer periphery to the adjacent segments by clips 14 which internally receive the segments and the segments are attached to the clips by suitable fasteners (not shown).

The segment 10 comprises a base 18 which includes a central box-like section having walls 20 enclosing a downwardly-tapering passage or duct 21 connected to one of the flow channels 24 in the hub 12 for draining filtrate from the segment 10. The base 18 also includes a pair of flanges 26 (one shown in FIG. 1), each being provided with a sleeve 28 containing one of the mounted bolts which detachably connect the segment 10 to the hub 12.

The segment 10 also has a pair of axially-spaced side walls 25,27 (see FIG. 2) each connected at one end to the base 18 and extending longitudinally from the base 18 in opposed-spaced relationship. The side walls overlap at the outer periphery of the sector 10 and also overlap along the radially-extending sides of the filter segment (see FIG. 4).

The sides walls 25,27 serve to support the metal filter screens 42 and each wall has a plurality of radially-extending, circumferentially-separated stiffening support ribs 40 (see FIG. 2) under the lands 41 separating louvers 44 (see FIG. 1). Support ribs 40 provide internal reinforcement for the side walls 25,27. The space 45 (see FIG. 2) between the side walls 25,27 throughout the lengths and breadths of the side walls 25,27 serves as a drainage duct and communicates with the passage 21 in the base 18 for draining filtrate from the filter segment.

In accordance with the present invention, and referring, more particularly, to FIG. 2 and FIG. 3, a plurality of metal members such as disks 50 are located on top of the wire screen 42. The disks 50 are spaced apart along the radially-extending lands 41 (see FIG. 1) with the disks along each of the lands 41 being staggered with respect to the disks on adjacent lands.

Each of the metal disks 50 is spot-welded through the wire screen 42 to a land 41. By spot-welding the metal disk through the metal screen 42 and to the lands 41, filler metal from the disk 50 is added to the filaments of the screen 42, strengthening it and making a solid bond to the side walls 25,27. The size of the weld can be regulated to give a solid bond and yet permit the metal screen 42 to be removed with a chipping hammer, cold chisel, or other means, without damaging the metal support.

As shown in FIG. 1 and FIG. 4, metal strips 55,56 may be welded to the support and the screen on each side wall 25,27 along the radially-extending borders of the filter segment 10. Metal strips 57 (only one shown in FIG. 1) may be welded to the support and the screen on each side wall 25,27 along the outer border of the filter segment 10.

I claim:

1. A filter for removing liquid from a slurry comprising: a metal filter screen support; a metal filter screen on the metal filter screen support, said filter screen support having openings adjacent the filter screen for the flow of filtrate into the support, and at least one drainage duct for draining the filtrate from the support; and a plurality of metal members on top of the filter screen, each metal member being welded through the screen and attached to the support.

2. A filter in accordance with claim 1 wherein: the filter screen support has a plurality of lands, the metal members are spaced along said lands, and each metal member is welded through the screen and attached to a land.

3. A filter in accordance with claim 2 wherein: the metal members are small disks with the disks along each of the lands being staggered with respect to the disks on adjacent lands.

4. A filter in accordance with claim 1 wherein: the filter screen support is a disk-type filter segment, and metal strips are welded on each face of the filter segment along the radially-extending borders and the outer border of the filter segment each metal strip being welded through the screen and attached to the support.

* * * * *